Feb. 12, 1924.  
C. P. LANDRETH ET AL  
1,483,667  
SEWAGE SCREENING APPARATUS  
Filed Nov. 6, 1919   5 Sheets-Sheet 1
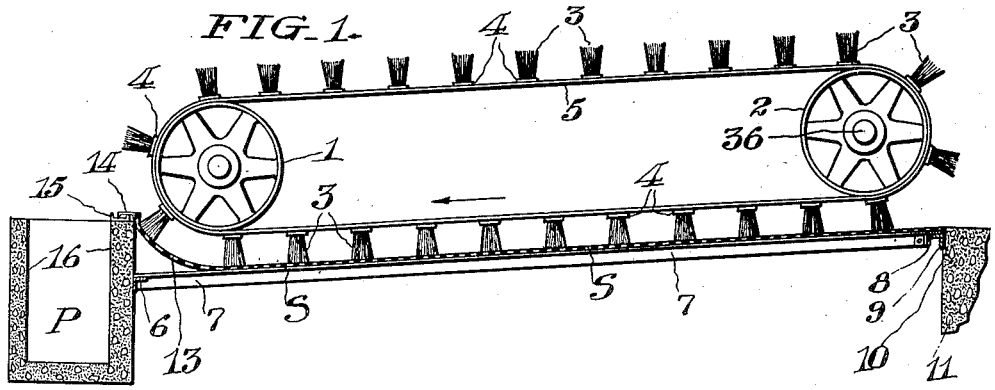
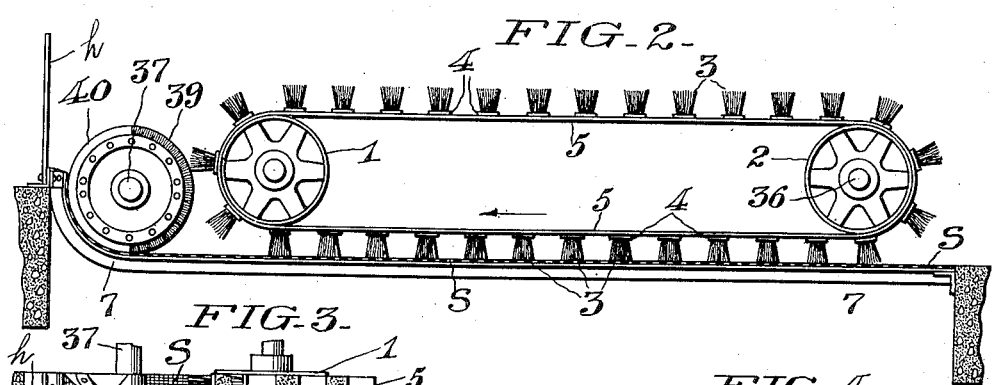
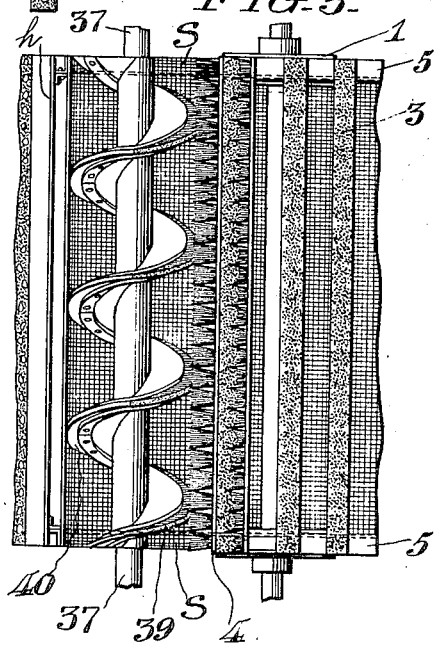
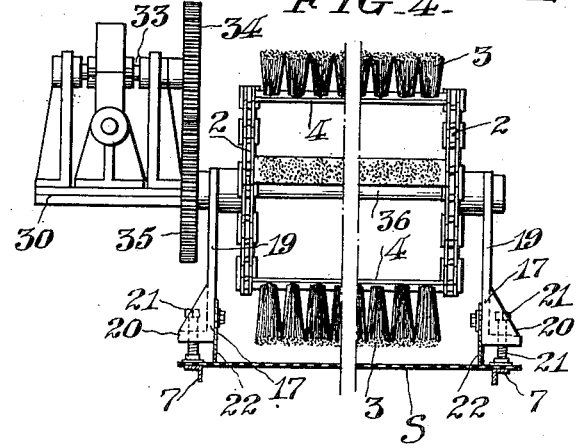
INVENTORS  
Clarence P. Landreth and  
Walter H. MacVaugh  
BY  
Cornelius D. Ehret  
their ATTORNEY.

Feb. 12, 1924.
C. P. LANDRETH ET AL
1,483,667
SEWAGE SCREENING APPARATUS
Filed Nov. 6, 1919    5 Sheets-Sheet 2
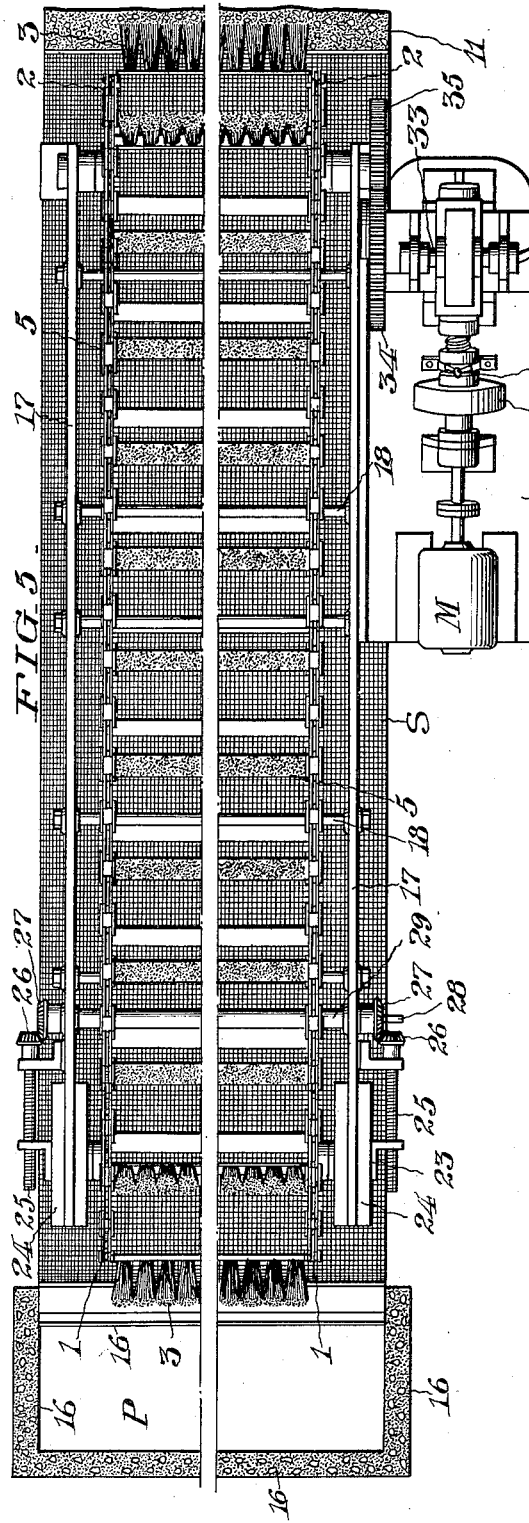
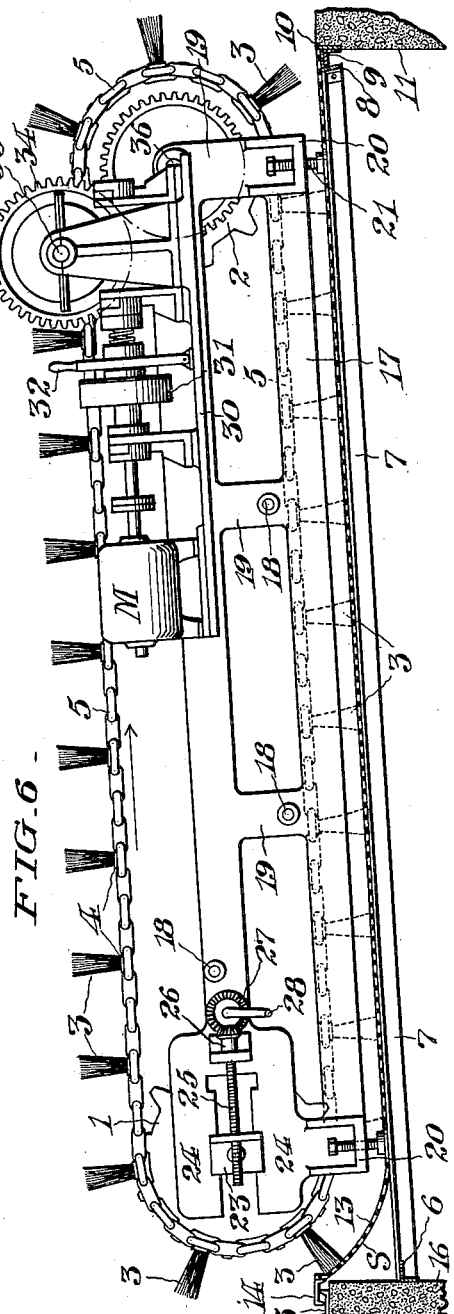
INVENTORS
Clarence P. Landreth
and Walter H. MacVaugh
BY
Cornelius D. Ehret
their ATTORNEY.

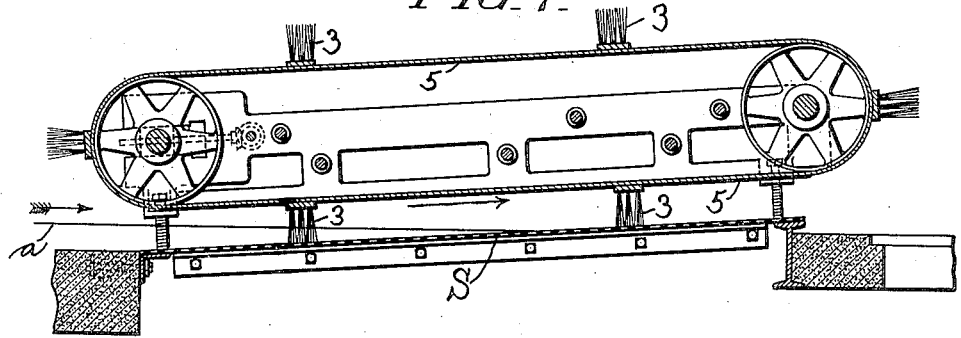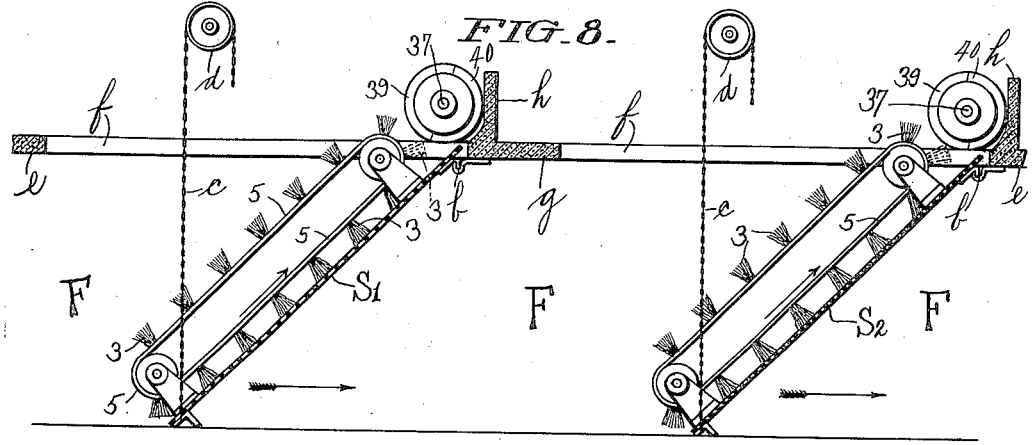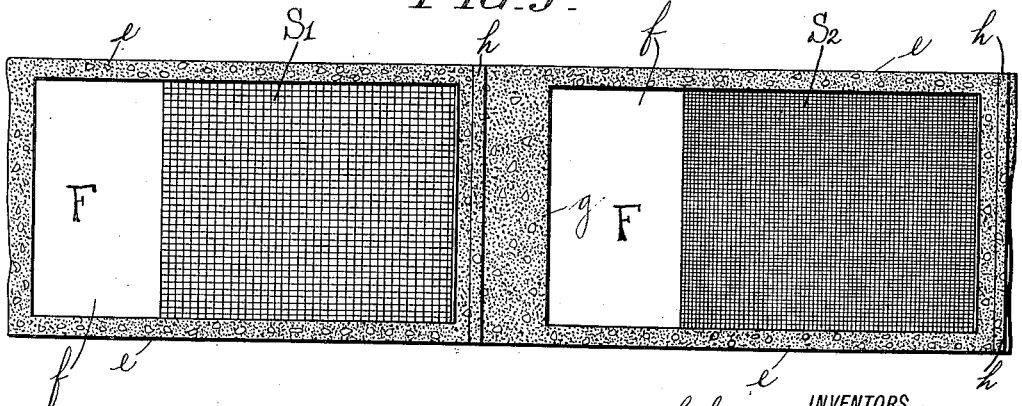

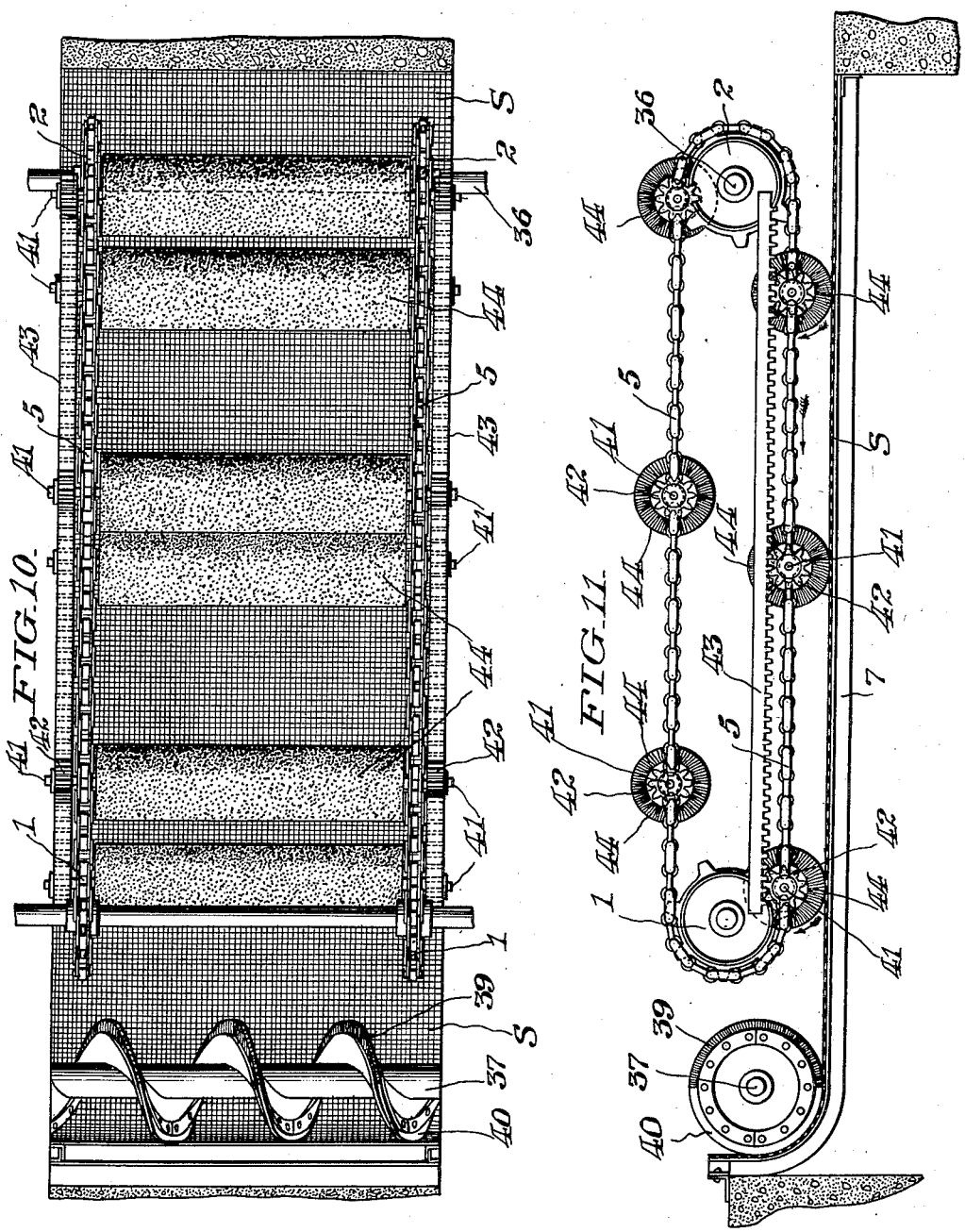

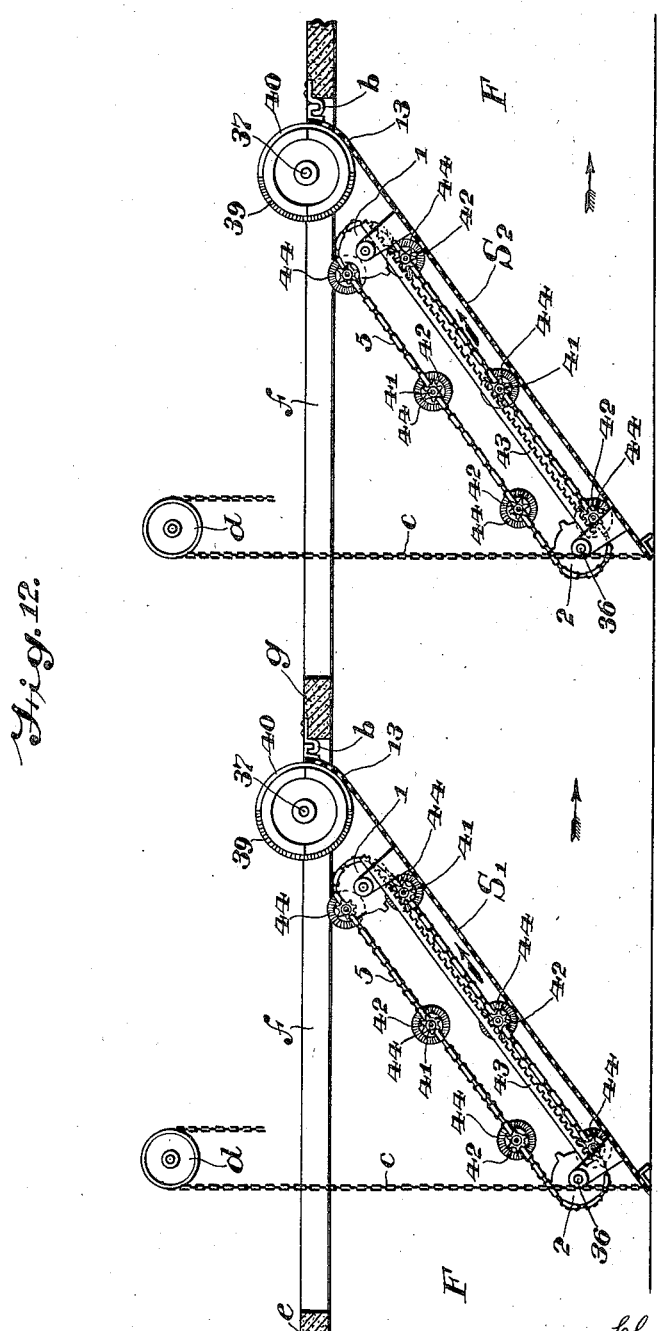

Patented Feb. 12, 1924.

1,483,667

UNITED STATES PATENT OFFICE.

CLARENCE P. LANDRETH AND WALTER H. MacVAUGH, OF PHILADELPHIA, PENNSYLVANIA; SAID MacVAUGH ASSIGNOR TO SAID LANDRETH.

SEWAGE-SCREENING APPARATUS.

Application filed November 6, 1919. Serial No. 336,193.

*To all whom it may concern:*

Be it known that we, CLARENCE P. LANDRETH and WALTER H. MACVAUGH, citizens of the United States, residing in the city and county of Philadelphia, State of Pennsylvania, have invented certain new and useful Improvements in Sewage-Screening Apparatus, of which the following is a specification.

Our invention relates to apparatus for screening from sewage or other liquids the solids and semi-solids contained therein.

To this end we provide a screen, which may be substantially level or inclined upwardly or downwardly, consisting of a plate or other structure having suitable perforations, over which is caused to flow the sewage or liquid to be screened, with associated brushing mechanism for brushing the solids or semi-solids retained upon the screen along the same, preferably in the direction of flow of the sewage or other liquid, causing accumulation at one end of the screen from which the collected matter is removed either by the brushing apparatus itself, manually or by assistance of associated wiping or brusing mechanism.

For an illustration of one of the various forms our invention may take, reference is to be had to the accompanying drawings, in which:

Fig. 1 is a side elevational view, partly in section, showing an inclined screen provided with brushing mechanism.

Fig. 2 is a side elevational view, partly in section, showing a screen provided with brushing structure with additional structure for removing from the screen the material accumulating thereon.

Fig. 3 is a fragmentary top plan view of part of the structure illustrated in Fig. 2.

Fig. 4 is an end elevational view, partly in vertical section, of structure shown in Fig. 5.

Fig. 5 is a top plan view of structure similar to that shown in Fig. 1, with associated driving means for the brushing mechanism.

Fig. 6 is a side elevational view of structure shown in Fig. 5.

Fig. 7 is a side elevational view, partly in section, of apparatus embodying our invention wherein the screen is upwardly inclined.

Fig. 8 is a vertical sectional view, partly in side elevation, of a series of upwardly inclined screens, operating upon the same stream of sewage or the like.

Fig. 9 is a top plan view of part of the structure shown in Fig. 8.

Figs. 10 and 11 are, respectively, plan and side elevational views of structure wherein the screen brushes partake of both longitudinal and rotary motions.

Fig. 12 is a side elevation, partly in section, of the structure shown in Fig. 11 arranged as in Fig. 8.

Referring to the drawings, S is a screen, of any suitable character or structure, and such, for example, as consists of a plate of metal having numerous small holes punched therethrough such holes being circular, elongated slots or of any other suitable shape. Extending along the longitudinal edges of the screen are angle irons 7 or equivalent members to which the screen S is preferably attached and by which it is stiffened. Extending transversely of the screen at its one end may be provided an angle iron 8 or equivalent structure which rests upon an angle iron 9 or equivalent secured to the plate 10 held in the concrete work or masonry 11. At its opposite end the screen may be suitably formed, as at 13, to extend or curve upwardly to form a sludge receptacle, the screen carrying at its end a channel iron 14 or equivalent hooked over a channel iron 15 carried upon the upper edge of the concrete work 16 which forms a pit or receptacle P for the sludge removed from screen S. The angle iron 7 may rest upon an angle iron 6 secured to the concrete work 16.

The brushing mechanism comprises the endless belt or chain 5 to which is suitably secured or pivoted any suitable number of transversely extending brush supports or holders 4 carrying the brushes 3 disposed in transverse rows. The endless belt members 5 are indicated as pivot link chains running upon sprocket wheels 1 and 2. The sprocket wheels are suitably journalled in a frame having the longitudinally extending side members 17, Figs. 5 and 6, with the transversely extending tie bars 18 passing through downwardly extending members 19 connecting the upper and lower side frame members 17. The frame has pedestals 20 through which extend the vertically adjustable bolts or screws 21 whose lower ends rest upon the screen S preferably directly over the side angle irons 7, 7, whereby these angle irons support the brush mechanism frame and the traveling brush mechanism. The adjustment of the screws 21 raises or lowers the brush structure away from or toward the screen S nicely to adjust the brushes with respect to the screen surface and to compensate for brush wear when occasion demands. Extending longitudinally inside of the lower longitudinal frame members 17 are disposed the downwardly hanging aprons or flaps 22 of metal, rubber or other suitable material adjustable vertically toward or away from the screen and preventing the sludge moved longitudinally of the screen by the brushing mechanism from passing off the sides of the screen.

The tension upon the belts or sprocket chains 5 may be adjusted by moving the sprocket wheels 1, 1 longitudinally of the frame. This is accomplished by structure such as indicated in Figs. 5 and 6, wherein the block 23 carries the bearings for the sprocket wheels 1, 1, the block 23 being slidable longitudinally in the guides 24 by the adjusting screws 25, 25 rotated by the bevel pinions 26, 26, in turn driven by the bevel gears 27, 27, which may be rotated by the hand crank 28, the gears 27 being secured upon one and the same shaft 29 having bearings in the side frames 17, 17.

Associated with the frame of the brush mechanism is a base member 30 upon which is mounted a motor M, as an electric motor or equivalent, which drives through suitable clutch 31, controlled by clutch lever 32, through suitable worm gearing the shaft 33 upon which is secured the gear 34 meshing with and driving the gear 35 secured upon the shaft 36 upon which are secured the sprocket wheels 2, 2, which drive the chains or belts 5, 5.

The operation is as follows:

The sewage or liquid to be screened flows from right toward the left, Fig. 1, over the abutment 11 on to the screen S at its higher end and flows along the same, the liquid passing downwardly through the screen perforations while the solids or semi-solids collect upon the screen surface. The brushes 3 move in the direction of the arrow, carrying the accumulated material longitudinally of the screen, in the example illustrated in the same direction as the flow of the liquid or sewage, carrying it to the lower end of the screen and upwardly along the curved portion 13 over the top edge of the channel 14, from which it drops into the pit P, from which it may be removed in any suitable way.

The sludge is kept from passing off the sides of the screen S by the aforementioned aprons 22, 22. As wear of the brushes takes place, the screws 21 may be adjusted to lower the pedestals 20, 20 a suitable amount from time to time to bring the brushes closer to the screen S. The brushes 3 are preferably capable of some pivotal movement with respect to the belts or chains 5, and they accordingly may wipe by slight dragging action longitudinally of the screen S.

While in Fig. 1 the screen has been shown inclined downwardly, it will be understood that the same may be used horizontally, as indicated in Fig. 2.

In Figs. 2 and 3 the longitudinally operating brushing mechanism is similar or equivalent to that hereinbefore described, but terminates short of one end of the screen, which may be horizontally disposed as indicated, or which may be inclined downwardly toward the left, as in the case of Fig. 1. At the left end of the screen S may be provided the transversely extending rotary shaft 37 carrying a helical structure upon whose outer edge may be disposed brush structure 39 or wiper structure 40, as of rubber, or, as illustrated, alternate sections of brush and wiper.

In this case the sludge brushed along the screen S by the brush mechanism comprising the brushes 3 is delivered to the transversely operating brushing or removing structure 39, 40, which due to the rotation of shaft 37, moves the sludge transversely of the screen and delivers it off from one side thereof to any suitable receptacle. A guard $h$ may be provided to prevent sludge or screenings from escaping from the apparatus.

As indicated in Fig. 1 the brushes 3 describe a circle which is concentric with the arc 13 to which the screen is formed at its left end, the brushes preferably remaining in contact with the screen throughout the arc 13.

Similarly in Fig. 2, it is preferred that the shaft 37 be concentric with the arc 13 of shaft 37, the brush or wiper structure 39, 40 fitting the arc 13 more or less closely or accurately.

In Fig. 7 the screen S is shown upwardly inclined from left toward the right, the sewage or other liquid to be screened flowing from the left and having such level, as $a$, causing it to rise any suitable distance along the screen S, with which latter cooperates brushing mechanism of the character hereinbefore described, the brushes in engagement with the screen also moving from left toward the right.

In Fig. 8 are shown two screens $S^1$ and $S^2$ which are inclined upwardly at any suitable angle, greater or less than that indicated, and each pivoted at $b$ and adapted to be raised by chain $c$ or equivalent passing over sheave or pulley $d$ or equivalent. The sewage or other liquid to be screened flows from left toward the right, encountering first the one screen and then the other, screen $S^1$ preferably being coarse while $S^2$ is of smaller aperture or mesh, as indicated in Fig. 9. The sewage flows in a flume F beneath the concrete or equivalent structure $e$, in which are formed openings or wells $f$, between which is the transversely extending platform $g$. Associated with each of the screens is brushing mechanism of the character herein described; and with either or both of the screens may be associated the transversely extending rotary brushing or removing structure 39, 40 of any suitable character, such as that herein described. Adjacent each of these last named rotary structures may be placed a vertically extending guard member $h$.

In operation each of the screens collects solids or semi-solids and the brushing mechanism moves it along the screen upwardly to the upper end thereof, from which it may be removed manually, or the sludge may be delivered to the rotary transverse removal structure, which delivers it to one side of the concrete or equivalent structure.

Generally the screens $s^1$ and $s^2$ will be inclined to the horizontal at smaller angles than indicated in Fig. 8, it being understood that the screens in the series may be inclined at like angles to the horizontal or at any suitable different angles.

In Figs. 10 and 11 the screen S is shown as extending substantially horizontally, though it will be understood that it may be inclined either upwardly or downwardly. It may be of any suitable structure, and may have associated therewith, as hereinbefore described, the transversely acting sludge removing structure 39, 40. The belt or chain structure 5 travels upon the sprocket wheels 1 and 2 of which one, as 2, may be driven by shaft 36 by electric motor or any other suitable drive, such for example, as hereinbefore described. The chain and sprocket structures are in duplicate, one on each side of the screen $s$; the chain structures move longitudinally thereof, for example in the direction of the arrow, Fig. 11, the sewage or liquid to be screened flowing onto the screen S at its right end. Supported and carried by the chains 5 are the transversely extending rotatable shafts 41. On the end of each shaft 41 is secured a pinion 42 meshing with a rack 43 held in fixed or stationary relation with respect to the screen S.

By driving the chains 5 upon sprocket wheels, the chains move longitudinally, as from right towards the left on their lower sides, thereby carrying the rotary brush structures 44, mounted upon and rotated by the shafts 41, longitudinally of the screen S toward the left, the brush structures 44 being simultaneously rotated in clockwise direction, as viewed in Fig. 11, whereby the sludge or semi-solids upon the screen S are subjected to rotary as well as longitudinal brush action, the rotary brush action tending also to move the sludge from right toward the left on the screen S.

In Fig. 12 the arrangement is similar to that shown in Fig. 8, the screens $S^1$ and $S^2$ being inclined upwardly at a suitable angle and each being pivoted at $b$ and adapted to be raised by chain $c$ passing over pulley $d$. Screens $S^1$ and $S^2$ here illustrated are of the type having an upturned end portion 13 with which the shaft 37 of the brush and wiper structure 39, 40 is preferably concentric as above described. Associated with each screen is brushing mechanism shown in Figs. 10 and 11. Sewage to be screened flows from left to right in the flume F, encountering first the screen $S^1$ and then the screen $S^2$, the solids collecting on the screens and being moved upwardly along the screens to the rotary transverse removal structure, which delivers it to one side of the concrete structure, as described with reference to the operation of the structure shown in Fig. 8.

What we claim is:

1. The combination with an upwardly inclined screen, of means directing fluid on to said screen adjacent its lower end, a frame supported by said screen, and brushing mechanism supported by said frame comprising an endless belt or chain and brushes carried thereby and moved longitudinally of the screen.

2. The combination with a screen, of means supporting said screen, a frame supported on and adjustable toward and away from the same, and brushing mechanism supported by said frame comprising an endless belt or chain and brushes carried thereby and moved longitudinally of the screen.

3. The combination with a screen, of a frame supported thereby, brushing mechanism supported by said frame comprising an endless belt or chain and brushes carried thereby and moved longitudinally of the screen, and aprons extending downwardly from said frame.

4. The combination with a screen, of reinforcing members extending along the edges thereof, abutments supporting said screen, a frame supported by said reinforcing members adjacent said screen, pulleys carried by said frame, an endless belt or chain structure driven by one of said pulleys, and brushes carried by said belt or chain structure sweeping along said screen.

5. The combination with a screen, of reinforcing members extending along the edges thereof, abutments supporting said screen, a frame supported by said reinforcing members adjacent said screen, pulleys carried by said frame, an endless belt or chain structure driven by one of said pulleys, brushes carried by said belt or chain structure sweeping along said screen, a motor, and a disengageable driving connection between said motor and one of said pulleys.

6. Apparatus for screening liquids, as sewage, comprising a screen terminating in an upwardly extending curved end portion, means delivering liquid to the upper side of said screen, and brushing mechanism for brushing material retained upon the screen longitudinally thereof from one end to said curved portion.

7. Apparatus for screening liquids, as sewage, comprising a screen having an upwardly extending curved end portion, means for moving material retained upon the screen longitudinally thereof to said curved end portion, and means co-operating with said curved end portion for removing said material from said screen.

8. Apparatus for screening liquids, as sewage, comprising a screen having an upwardly extending curved end portion, brushing mechanism for brushing material retained upon the screen longitudinally thereof, and means comprising a rotary shaft carrying helically disposed removal structure co-operating with said curved end portion for removing transversely of the screen the material delivered to said means by said brushing mechanism.

9. Apparatus for screening solids or semi-solids from liquid, comprising an inclined screen over which the liquid flows, said screen having an upwardly inclined curved end portion, brushing mechanism for moving material longitudinally of said screen comprising brushes and means for simultaneously rotating said brushes and moving the same longitudinally of said screen, and means co-operating with said upwardly inclined curved end portion for removing transversely of said screen the material delivered to said means by said brushing mechanism.

10. Apparatus for screening solids or semi-solids from liquid, comprising an inclined screen pivoted at one end, means for adjusting said screen about said pivot to change the inclination thereof, means for delivering to said screen liquid to be screened, and brushing mechanism traversing said screen longitudinally.

In testimony whereof we have hereunto affixed our signatures this 29" day of October, 1919.

CLARENCE P. LANDRETH.
WALTER H. MacVAUGH.